United States Patent [19]

Kondo et al.

[11] Patent Number: 5,434,679
[45] Date of Patent: Jul. 18, 1995

[54] IMAGE FORMING APPARATUS

[75] Inventors: Masaya Kondo, Tokyo; Takeshi Ono, Kawasaki, both of Japan

[73] Assignee: Canon Kabushiki Kaisha, Tokyo, Japan

[21] Appl. No.: 897,856

[22] Filed: Jun. 12, 1992

[30] Foreign Application Priority Data

Jun. 18, 1994 [JP] Japan .................. 3-146118

[51] Int. Cl.⁶ .................................. H04N 1/393
[52] U.S. Cl. ........................ 358/451; 382/298
[58] Field of Search ............. 358/451, 447, 296, 401, 358/400, 451, 452, 448, 447; 382/47; 395/139

[56] References Cited
U.S. PATENT DOCUMENTS

5,117,294 5/1992 Yano ..................... 358/451
5,153,936 10/1992 Morris et al. ............. 387/47

Primary Examiner—Stephen Brinich
Assistant Examiner—Jerome Grant, II
Attorney, Agent, or Firm—Fitzpatrick, Cella, Harper & Scinto

[57] ABSTRACT

There is disclosed an image forming apparatus in which an image is formed by recording image data of each line by a-predetermined number of times in succession. In case of forming an image which is reduced in size in the sub scanning direction, the number of recordings of image data of each line is reduced from the above-mentioned predetermined number, so that the reduced image can be obtained with minimum deterioration in image quality, and without conventional skipping of the original image data.

16 Claims, 4 Drawing Sheets

IMAGE FORMING APPARATUS

BACKGROUND OF THE INVENTION

1. Field of the Invention

The present invention relates to an image forming apparatus capable of forming an image by reducing the size of an input image, and more particularly an image forming apparatus adapted for use in an image communication apparatus such as a facsimile apparatus or the like.

2. Related Background Art

In the conventional image communication apparatus such as a facsimile, the received image sometimes becomes longer than the regular size, for example because of the addition of a header and unrecordable on the recording sheet of regular size. In such case the received data are recorded with a size reduction in the sub scanning direction, and such size reduction is generally achieved by skipping the received image data of a line at every predetermined interval.

In the conventional image communication apparatus, the transmitting unit transmits the image by selecting one of plural sub scanning line densities and reading the image with thus selected line density, and the receiving unit forms an image with recording means, such as a thermal head, based on the received data.

The sub scanning line density is generally selected from a standard density (3.85 line/mm), a fine density (7.7 line/mm) and a super-fine density (15.4 line/mm), so that the recording means of the receiving unit is so designed to enable recording with the super-fine sub scanning line density (15.4 line/mm). If the received data are of the standard density (3.85 line/mm), the receiving unit records the received data of each line four times in succession, with a movement of the recording sheet by 1/15.4 mm each time. If the received data are of the fine density (7.7 line/mm), the receiving unit records the received data of each line two times in succession, with a movement of the recording sheet by 1/15.4 mm each time.

In case of the above-mentioned size reduction in the sub scanning direction, the received data of a line are skipped at a predetermined interval. For example, in case of a size reduction to 90%, the received of a line in every 10 lines are skipped. For this reason, the recorded image is deteriorated significantly, as the data of 1/3.85 mm or 1/7.7 mm are lost respectively in case of the standard density or of the fine density.

SUMMARY OF THE INVENTION

The present invention is to resolve the above-mentioned drawbacks in the prior art, and an object of the present invention is to provide an image forming apparatus capable of minimizing the image quality deterioration in case the image is recorded with a size reduction.

Another object of the present invention is to provide an image forming apparatus capable of preventing the image quality deterioration in case of image size reduction by skipping of the input data.

Still another object of the present invention is to provide an image forming apparatus, adapted for forming an image by recording same image data by a predetermined number of times, capable of forming a reduced image by reducing the number of recording from said predetermined number.

Still another object of the present invention is to provide an image forming apparatus capable of providing a reduced image with reduced image quality deterioration by as simple configuration.

The foregoing and still other objects of the present invention, and the features thereof, will become fully apparent from the following detailed description, to be taken in conjunction with the accompanying drawings.

DETAILED DESCRIPTION OF THE PREFERRED EMBODIMENTS

Figure 1:
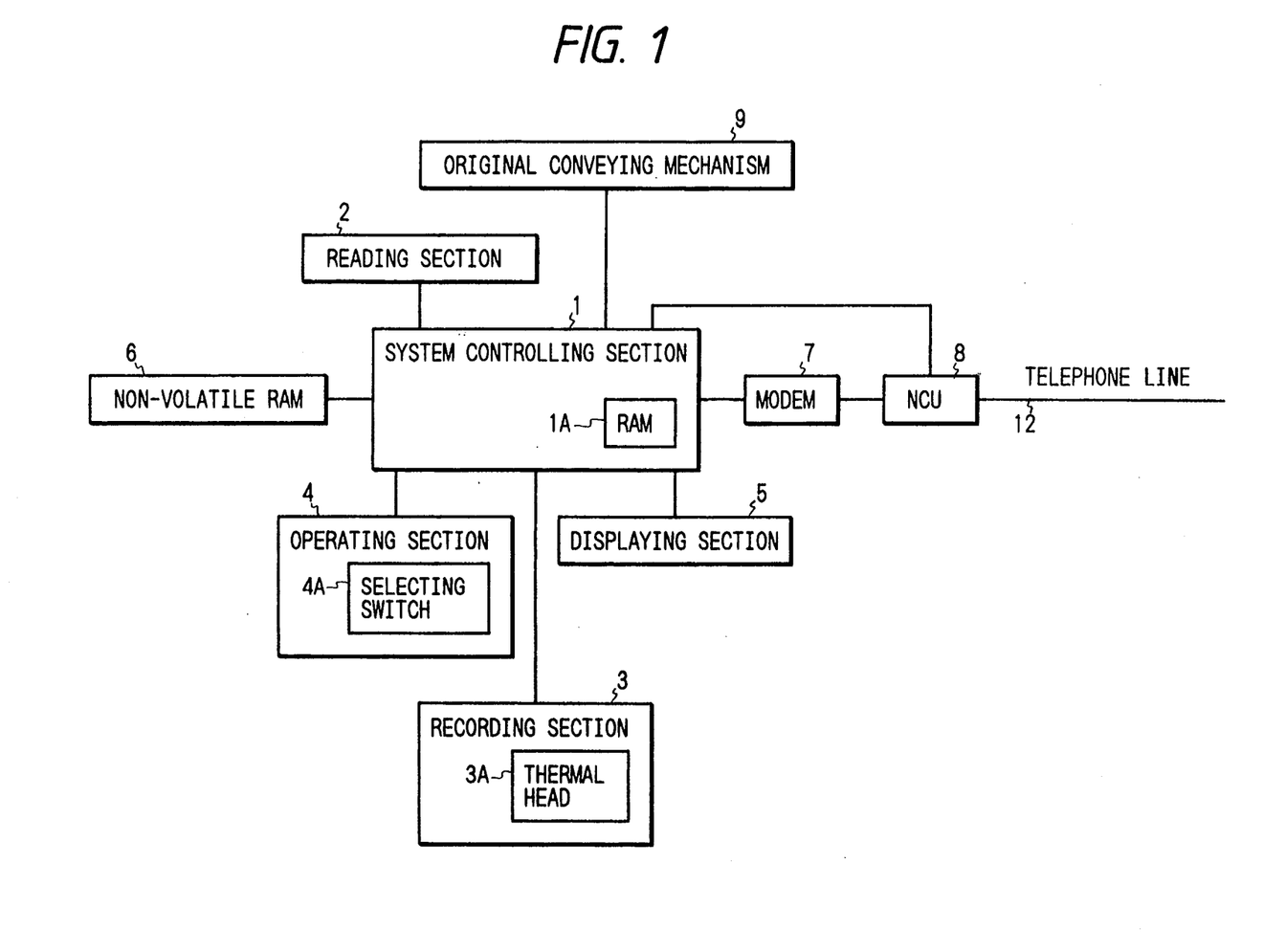
FIG. 1 is a block diagram of an embodiment of the present invention.

FIG. 1 is a block diagram showing the circuit configuration of a facsimile apparatus embodying the present invention.

Figure 2:
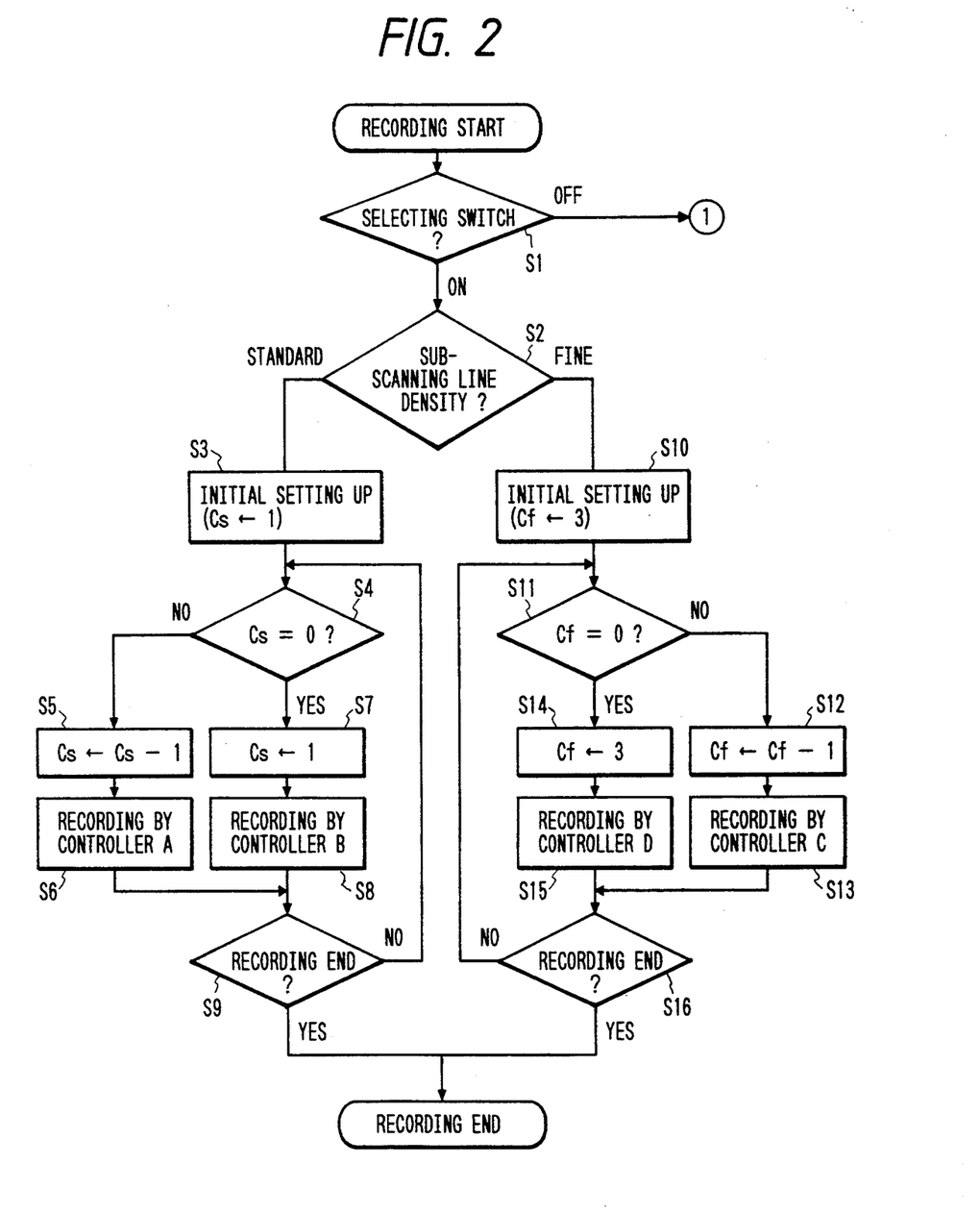
FIGS. 2 and 3 are flow charts showing the control sequence executed by a system control unit 1 shown in FIG. 1.
Figure 3:
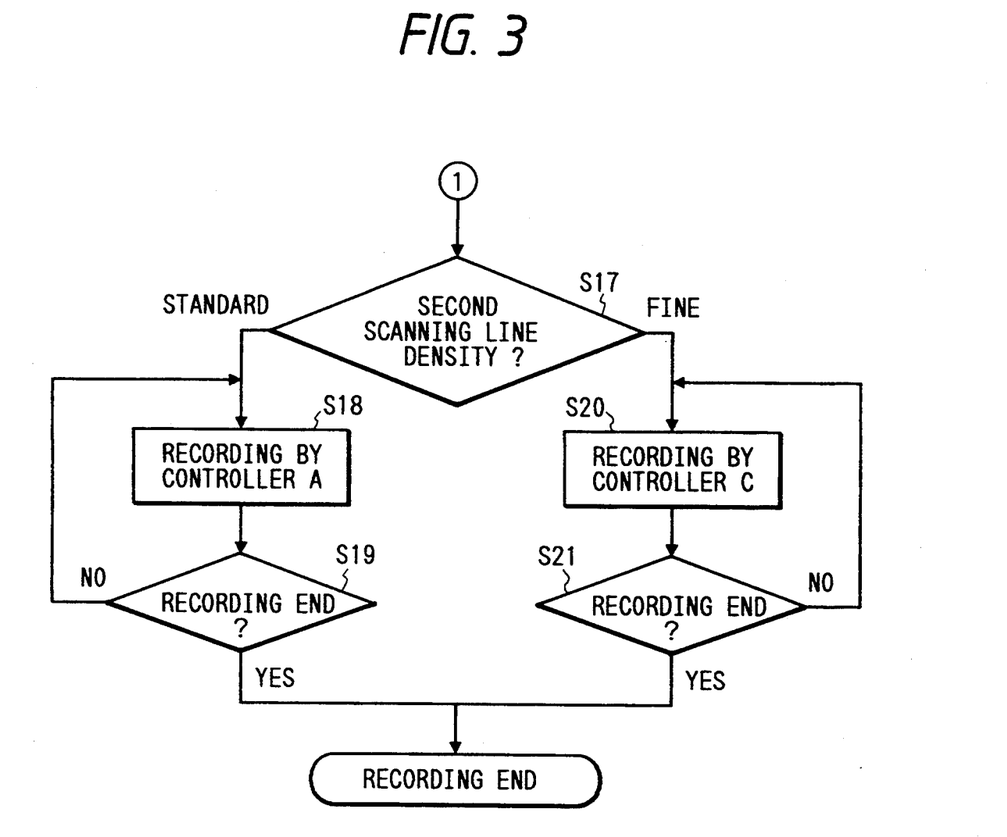

A system control unit (or system controlling section) 1 is composed for example of a microcomputer and a memory, and includes a read-only memory (ROM) 1A storing in advance the control sequences shown in FIGS. 2 and 3.

A reading unit (or reading section) 2 is provided with a CCD (charge-coupled device) image sensor for reading an original document, to be transmitted, transported by an original transporting mechanism (or original conveying mechanism) 9.

A recording unit (or recording section) 3 effects thermal transfer recording of an image, on a recording sheet, by means of a thermal head 3A according to the received image signal.

An operation unit (or operating section) 4 is provided with various operation keys, including a selection switch (or selecting switch) 4A for instructing the image size reduction according to the present invention.

A display unit (or displaying section) 5 displays the status of the apparatus and alarm messages. The operation unit 4 and the display unit 5 may be integrally constructed as an operation display unit.

A random access memory (RAM) 6 is composed of a non-volatile memory and is used for registering communication data, such as telephone numbers of the destination units. Said RAM 6 may also be composed of a volatile memory provided with a back-up battery. A modem (modulator-demodulator) 7 effects the modulation and demodulation of the transmitted and received signals.

A network control unit (NCU) 8 has a function of sending selection signals (pulse signals or tone dialling signals), and effects not only the automatic call reception and network controlling by detection of call tone but also the transmission of selection signals to a telephone line 12 under the control of the system control unit 1.

FIGS. 2 and 3 are flow charts showing the control sequence of the system control unit 1 shown in FIG. 1.

In the present embodiment, the selection switch 4A of the operation unit 4 is to select the image size reduction in the sub scanning direction at the image recording, and, when said switch 4A is actuated, the image size is reduced to 84.5%. This switch is provided for preventing a situation in which the transmitting unit sends the A4-sized data with a header containing for example the destination information, and the receiving unit is unable to record the transmitted information on an A4-sized recording sheet. The thermal head 3A is assumed to have a sub scanning line density of super-fine density (15.4 line/ram).

In the present embodiment, the number of recordings of same data in the sub scanning direction is made variable in the standard density mode, fine density mode, standard density reduction mode, and fine density reduction mode.

In the standard density mode with a sub scanning line density of 3.85 line/mm, same data are recorded four times in succession, with sub scanning motions. The control sequence for effecting such recording shall be called the control A.

In the standard density reduction mode, there is locally employed recording control sequence in which same data are recorded three times in succession in the sub scanning direction. Such control sequence shall be called the control B.

In the fine density mode with a sub-scanning line density of 7.7 line/mm, same data are recorded twice in the sub scanning direction. Such control sequence shall be called the control C.

In the fine density reduction mode, there is locally employed recording control sequence in which data are recorded only once in the sub scanning direction. Such control sequence shall be called the control D, and is same as the recording operation in the super-fine density mode with a sub-scanning density of 15.4 line/mm.

In any of the above-mentioned four modes, the amount of movement of the recording sheet in the sub scanning direction per recording is 1/15.4 mm.

Referring to FIG. 2, at first the system control unit 1 discriminates whether the selection switch 4A in the operation unit 4 has been depressed (S1), and, if depressed, the sequence enters a reduction recording mode. Then there is discriminated the sub scanning line density of the received image (S2). Said density is determined by a reception command signal DCS sent from the transmitting unit. The sequence proceeds to a step S3 or S10, respectively if said density is the standard density or the fine density.

In case of recording with the standard sub scarning line density, an initial value "1" is set in a counter Cs for counting the number of recorded lines (S3). Then there is discriminated whether the count of the counter Cs is "0" (S4), and, if not "0", the value of the counter Cs is decreased by one (S5). Then the data of a line are recorded four times in succession, according to the control sequence A for the standard mode recording (S6). If the count of the counter Cs is "0", a value "1" is set therein (S7), and data of a line are recorded three times in succession according to the control sequence B (S8). After the recording, there is discriminated whether the recording operation has been completed (S9), and, if not, the recording operation is continued.

In the following there will be further explained the control sequence from S3 to S9. The initial value of the counter Cs is determined by the reduction ratio, and the above-mentioned value is adopted for achieving a size reduction to 84.5%. A size reduction to 84.5% or to $\frac{7}{8}$, can be achieved by deletion of a line in every eight lines. In the present embodiment, in case of reduction recording for the standard sub scanning line density, a standard line (1/3.85 mm=4/15.4 mm) is partly reduced to 3/15.4 mm by employing the control sequence B in which same data are recorded three times in succession with the super-fined sub scanning density. More specifically, the control sequence B for the standard density reduction mode and the control sequence A for the standard density mode are alternately executed (Cs=1) whereby two standard lines (8/15.4 mm) are reduced to:

3/15.4 mm+4/15.4 mm=7/15.4 mm corresponding to a reduction to $\frac{7}{8}$=84.5%.

Figure 4:
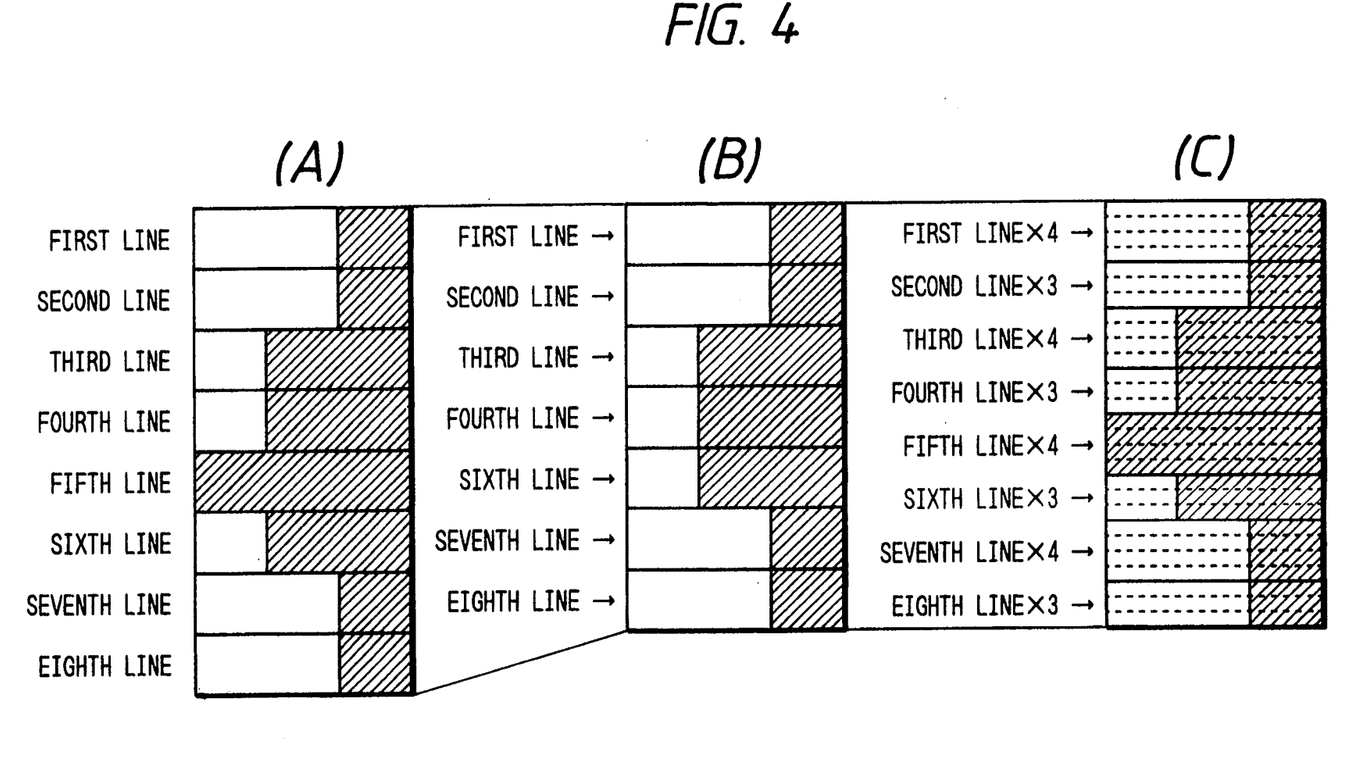
FIG. 4 is a view showing examples of reduced image, obtained in the conventional method and according to the present invention.

In FIG. 4, (A) illustrates standard received image data, while (B) illustrates a conventional size reduction, obtained by deleting the 5th line in (A), and (C) illustrates the size reduction of the present embodiment, obtained by alternating the control A (recording of four times) and the control B (recording of three times). In comparison with (B), (C) provides an image more faithful to the received data.

On the other hand, in case of recording with the fine sub scanning line density, an initial value "3" is set in a counter Cf (S10). Then there is discriminated whether the count of the counter Cf is "0" (Sll), and, if not "0", the count of the counter Cf is decreased by one (S12). Then the data of a line are recorded twice in succession, according to the control sequence C for the ordinary fine sub scanning line density (S13).

If the count of the counter Cf is "0", a value "3" is set therein (S14), and the data of a line are recorded according to the control sequence D (S15). After the recording operation, there is discriminated whether the recording operation has been completed (S16), and, if not, the recording operation is continued.

In the following there will be further explained the control sequence from S10 to S16. The initial value of the counter Cf is determined by the reduction ratio, and the above-mentioned value is adopted for achieving a size reduction to 84.5%. In the present embodiment, in case of reduction recording for the fine sub scanning line density, a fine line (1/7.7 mm=2/15.4 mm) is reduced to 1/15.4 mm by partly employing the control sequence D for recording the data once with the super-fine line density. More specifically, in case of image reduction with the fine line mode, there is conducted the control sequence D once after every three executions (after every detection of Cf=3) of the control sequence C for the ordinary fine density recording, whereby 4 fine lines (8/15.4 mm) are reduced to:

(2/15.4 mm)×3+1/15.4 mm=7/15.4 mm corresponding to a reduction $\frac{7}{8}$=84.5%.

In case the operator does not select the reduction recording, there is discriminated the sub scanning line density of the received image (S17), and, if the standard line density is instructed, the recording is conducted with the control sequence A for the ordinary standard density recording (S18). Then there is discriminated whether the recording has been completed (S19), and, if not completed, the recording operation is continued.

In case the fine density recording is instructed, the recording is conducted with the control sequence C for the ordinary fine density recording (S20). Then there is discriminated whether the recording has been completed (S21), and, if not completed, the recording operation is continued.

In addition to the foregoing example, there can be conceived following examples:

(1) The foregoing example is designed to reduce the image size to 84.5% in the sub scanning direction, but the reduction ratio is not limited thereto. Also the reduction ratio need not be fixed. In case the reduction ratio is made variable, the sub scanning line densities and the number of recording of same data in the sub scanning direction are memorized, in relation to the reduction ratios, in a table. In this case the information corresponding to the instructed reduction ratio is read from said table, and the image size reduction is attained according to said information.

It is also possible to record the received image with size reduction, on the sheet of predetermined size, utilizing the function for varying the reduction ratio mentioned above.

(2) The foregoing example employs a thermal head with a print size in the sub scanning direction corresponding to the super-fine line density, but said print size may be suitably determined according to the reduction ratio of image.

(3) The foregoing example has provided an image size reduction to 84.5%, but a size reduction down to 75% is possible by varying the ratio of combination of the standard line density mode and the standard line density reduction mode. Also the reduction ratio can be expanded to 50% by adding another control sequence (control E) in which same data are recorded twice in succession for every movement of the recording sheet by 1/7.7 mm (fine line density). Further the reduction ratio can be expanded to 25% by combining the super-fine line density (15.4 mm).

(4) The foregoing example represents the application of the present invention to a facsimile apparatus, but the present invention is likewise applicable to image reduction in a line-by-line printing apparatus or a line-by-line display apparatus.

As explained in the foregoing, the present invention provides an image including reduced image portions at a regular interval, by partially varying the sub scanning line density at the image formation. The image reduction is achieved by reducing the number of uses of same data in the image formation, so that the data skipping on the entire image data themselves is unnecessary and the deterioration in the quality of formed image can be minimized.

The present invention has been explained by preferred embodiments thereof, but the present invention is not limited to such embodiments and is subject to various modifications within the scope and spirit of the appended claims.

What is claimed is:

1. An image forming apparatus comprising:
    input means for inputting image data of a first density;
    image forming means for forming an image by recording same data, from said input means, by a predetermined number of times in succession; and
    control means for controlling the number of recordings of the same data by said image forming means,
    wherein said control means consists of first control means for causing said image forming means to record the same data m times and second control means for causing said image forming means to record the same data n times, and
    said image forming means forms, in case of performing a one-page recording, a reduced image using said first and second control means.

2. An image forming apparatus according to claim 1, wherein said input means is adapted to receive and enter image data transmitted from another communication apparatus through a communication channel.

3. An image forming apparatus according to claim 1, wherein said image forming means is adapted to record same data by a predetermined number of times in succession, so as to record the data of the first density from said input means, with a second density higher than said first density.

4. An image forming apparatus according to claim 3, wherein said first and second densities are densities in the sub scanning direction, and said image forming means is adapted to record the data of a line with the first density, by a predetermined number of times in succession, thereby forming an image with the second density.

5. An image forming apparatus according to claim 1, wherein said control means is adapted to vary the number of recordings of same data, according to the density of image data entered by said input means.

6. An image forming apparatus according to claim 5, wherein said control means is adapted, in case the input image data has a density of 3.85 line/mm and said image forming means has a recording density of 15.4 line/mm, to cause same data to be recorded four times.

7. An image forming apparatus according to claim 5, wherein said control means is adapted, in case the input image data has a density of 7.7 line/mm and said image forming means has a recording density of 15.4 line/mm, to cause same data to be recorded twice.

8. An image forming apparatus according to claim 1, further comprising selection means for selecting reduced recording of image.

9. A method of forming an image consisting of the steps of:
    an input step of inputting image data of a first density;
    an image forming step of forming an image by recording same data, from the input step, by a predetermined number of times in succession; and
    a control step of controlling the number of recordings of the same data by the image forming step,
    wherein the control step consists of a first control step for causing the image forming step to record the same data m times and a second control step for causing the image forming step to record the same data n times, and
    the image forming step forms, in case of performing a one-page recording, a reduced image using the first and second control steps.

10. A method of forming an image according to claim 9, wherein the input step is adapted to receive and enter image data transmitted from another communication apparatus through a communication channel.

11. A method of forming an image according to claim 9, wherein the image forming step is adapted to record same data by a predetermined number of times in succession, so as to record the data of the first density from the input step, with a second density higher than the first density.

12. A method of forming an image according to claim 11, wherein the first and second densities are densities in the sub scanning direction, and the image forming step is adapted to record the data of a line with the first density, by a predetermined number of times in succession, thereby forming an image with the second density.

13. A method of forming an image according to claim 9, wherein the control step is adapted to vary the number of recordings of same data, according to the density of image data entered by the input step.

14. A method of forming an image according to claim 13, wherein the control step is adapted, in case the input image data has a density of 3.85 line/mm and the image forming step has a recording density of 15.4 line/mm, to cause same data to be recorded four times.

15. A method of forming an image according to claim 13, wherein the control step is adapted, in case the input image data has a density of 7.7 line/mm and the image forming step has a recording density of 16.4 line/mm, to cause same data to be recorded twice.

16. A method of forming an image according to claim 9, further comprising a selection step for selecting reduced recording of image.

* * * * *

UNITED STATES PATENT AND TRADEMARK OFFICE
CERTIFICATE OF CORRECTION

PATENT NO. : 5,434,679
DATED : July 18, 1995
INVENTOR(S) : MASAYA KONDO, ET AL.

It is certified that error appears in the above-identified patent and that said Letters Patent is hereby corrected as shown below:

ON TITLE PAGE

In [30] Foreign Application Priority Data:
   "Jun. 18, 1994" should read --Jun. 18, 1991--.

In [57] ABSTRACT, line 3: "a-predetermined" should read --a predetermined--.

COLUMN 1

Line 45, "received" should read --received data--.

COLUMN 2

Line 2, "as" should read --a--.
Line 44, "operation display" should read --operation-display--.

COLUMN 3

Line 6, "(15.4 line/ram)." should read --(15.4 line/mm).--.
Line 43, "respectively" should read --respectively,--.

UNITED STATES PATENT AND TRADEMARK OFFICE
CERTIFICATE OF CORRECTION

PATENT NO. : 5,434,679
DATED : July 18, 1995
INVENTOR(S) : MASAYA KONDO, ET AL.

It is certified that error appears in the above-identified patent and that said Letters Patent is hereby corrected as shown below:

COLUMN 4

Line 2, "super-fined" should read --super-fine--.
Line 64, "following" should read --the following--.

Signed and Sealed this

Twenty-first Day of November, 1995

Attest:

BRUCE LEHMAN

Attesting Officer     Commissioner of Patents and Trademarks